(12) United States Patent
Choi et al.

(10) Patent No.: US 11,817,269 B2
(45) Date of Patent: Nov. 14, 2023

(54) MULTILAYER CAPACITOR

(71) Applicant: SAMSUNG ELECTRO-MECHANICS CO., LTD., Suwon-si (KR)

(72) Inventors: Hong Je Choi, Suwon-si (KR); Jung Min Kim, Suwon-si (KR); Ji Hye Han, Suwon-si (KR); Byung Woo Kang, Suwon-si (KR); Hye Jin Park, Suwon-si (KR); Sang Wook Lee, Suwon-si (KR); Bon Seok Koo, Suwon-si (KR); Jung Won Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 78 days.

(21) Appl. No.: 17/747,432

(22) Filed: May 18, 2022

(65) Prior Publication Data
US 2023/0170146 A1 Jun. 1, 2023

(30) Foreign Application Priority Data
Dec. 1, 2021 (KR) .................. 10-2021-0170009

(51) Int. Cl.
*H01G 4/232* (2006.01)
*H01G 4/008* (2006.01)
*H01G 4/30* (2006.01)

(52) U.S. Cl.
CPC .......... *H01G 4/2325* (2013.01); *H01G 4/008* (2013.01); *H01G 4/30* (2013.01)

(58) Field of Classification Search
CPC .......... H01G 4/30; H01G 2/065; H01G 4/008; H01G 4/012; H01G 4/12; H01G 4/2325
See application file for complete search history.

(56) References Cited

U.S. PATENT DOCUMENTS

2011/0132637 A1 6/2011 Otani et al.
2013/0107421 A1 5/2013 Zenzai et al.
(Continued)

FOREIGN PATENT DOCUMENTS

JP 5870894 B2 3/2016
KR 10-2011-0063311 A 6/2011
KR 10-2021-0043543 A 4/2021

*Primary Examiner* — Michael P McFadden
(74) *Attorney, Agent, or Firm* — Morgan, Lewis & Bockius LLP (57) ABSTRACT

A multilayer capacitor includes a body including a stack structure in which at least one first internal electrode and at least one second internal electrode are alternately stacked in a first direction with at least one dielectric layer interposed therebetween; and first and second external electrodes spaced apart from each other and disposed on the body, wherein each of the first and second external electrodes includes a conductive resin layer including a resin, a plurality of metal particles, and a conductive connection portion connecting portions of the plurality of metal particles to each other, and in the conductive resin layer, a volume ratio of metal particles spaced apart from the conductive connection portion, among the plurality of metal particles, to a sum of the plurality of metal particles and the conductive connection portion is greater than 0% and less than 4.9%.

20 Claims, 11 Drawing Sheets

(56) References Cited

U.S. PATENT DOCUMENTS

| | | | |
|---|---|---|---|
| 2016/0099110 A1* | 4/2016 | Lee | C09D 5/24 |
| | | | 252/514 |
| 2018/0166215 A1* | 6/2018 | Hamanaka | H01G 4/12 |
| 2018/0254138 A1* | 9/2018 | Koo | H01F 27/29 |
| 2019/0157006 A1* | 5/2019 | Han | H01G 4/008 |
| 2019/0295773 A1* | 9/2019 | Kim | H01G 4/30 |
| 2021/0050152 A1* | 2/2021 | Zenzai | H05K 1/092 |

\* cited by examiner

MULTILAYER CAPACITOR

CROSS-REFERENCE TO RELATED APPLICATION(S)

This application claims benefit of priority to Korean Patent Application No. 10-2021-0170009 filed on Dec. 1, 2021 in the Korean Intellectual Property Office, the disclosure of which is incorporated herein by reference in its entirety.

TECHNICAL FIELD

The present disclosure relates to a multilayer capacitor.

BACKGROUND

A multilayer capacitor is widely used as a component for electronic devices such as computers, PDAs, and mobile phones, due to advantages thereof such as guaranteed high capacitance even with a small size, and ease of mounting thereof, and is widely used as a component for electric devices (including vehicles) due to high reliability and desirable characteristics such as high strength.

The multilayer capacitor may include an external electrode for providing external capacitance, and the external electrode may require reliability to be stably mounted or embedded in a substrate or an electronic device, require reliability to prevent penetration of moisture and/or plating solution into the multilayer capacitor, require durability to withstand external shocks and temperature changes, require stacking stability for an internal structure or an external structure of the external electrode, or require low equivalent series resistance (ESR).

SUMMARY

An aspect of the present disclosure is to provide a multilayer capacitor capable of efficiently improving performance of an external electrode (e.g., at least one of reliability, durability, stacking stability, or a reduction in equivalent series resistance).

According to another aspect of the present disclosure, a multilayer capacitor includes a body including a stack structure in which at least one first internal electrode and at least one second internal electrode are alternately stacked in a first direction with at least one dielectric layer interposed therebetween; and first and second external electrodes spaced apart from each other and disposed on the body to be respectively connected to the at least one first internal electrode and the at least one second internal electrode, wherein each of the first and second external electrodes includes a conductive resin layer including a resin, a plurality of metal particles, and a conductive connection portion connecting portions of the plurality of metal particles to each other, and in the conductive resin layer, a volume ratio of metal particles spaced apart from the conductive connection portion, among the plurality of metal particles, to a sum of the plurality of metal particles and the conductive connection portion is greater than 0% and less than 4.9%.

According to another aspect of the present disclosure, a multilayer capacitor includes a body including a stack structure in which at least one first internal electrode and at least one second internal electrode are alternately stacked with at least one dielectric layer interposed therebetween; and first and second external electrodes spaced apart from each other and disposed on the body to be respectively connected to the at least one first internal electrode and the at least one second internal electrode, wherein each of the first and second external electrodes comprises a conductive resin layer including a resin, a plurality of metal particles, and a conductive connection portion connecting portions of the plurality of metal particles to each other, the plurality of metal particles comprise a first metal, at least a portion of the plurality of metal particles is coated with a second metal, and a mass ratio of the conductive connection portion to a sum of the second metal coated on the at least a portion of the plurality of metal particles and the plurality of metal particles is 4/6 or more and 7/3 or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Embodiments of the present disclosure can be modified into various other forms, and the scope of the present disclosure is not limited to the embodiments described below. Furthermore, the embodiments of the present disclosure are provided to more fully describe the present disclosure to those skilled in the art. Accordingly, the shapes and sizes of the elements in the drawings may be exaggerated for clarity of description, and the elements denoted by the same reference numerals in the drawings are the same elements.

In order to clearly illustrate the present disclosure in the drawings, thicknesses have been enlarged for the purpose of clearly illustrating the layers and regions, and an element having the same function within the scope of the same idea may be explained using the same symbol.

Throughout the specification, when an element is referred to as "comprising," it means that it can include other elements as well, without excluding other elements unless specifically stated otherwise.

When the direction of the parallelepiped is defined to clearly describe the embodiments of the present disclosure, X, Y, and Z indicated in the drawings represent a length (L) direction, a width (W) direction, and a thickness (T) direction, respectively. In this case, the thickness direction may be used as the same concept as a stacking direction in which the dielectric layers are stacked (or a first direction).

Hereinafter, a multilayer capacitor according to an embodiment will be described, and in detail, a multilayer ceramic capacitor (MLCC) will be described, but the present disclosure is not limited thereto.

Figure 1:
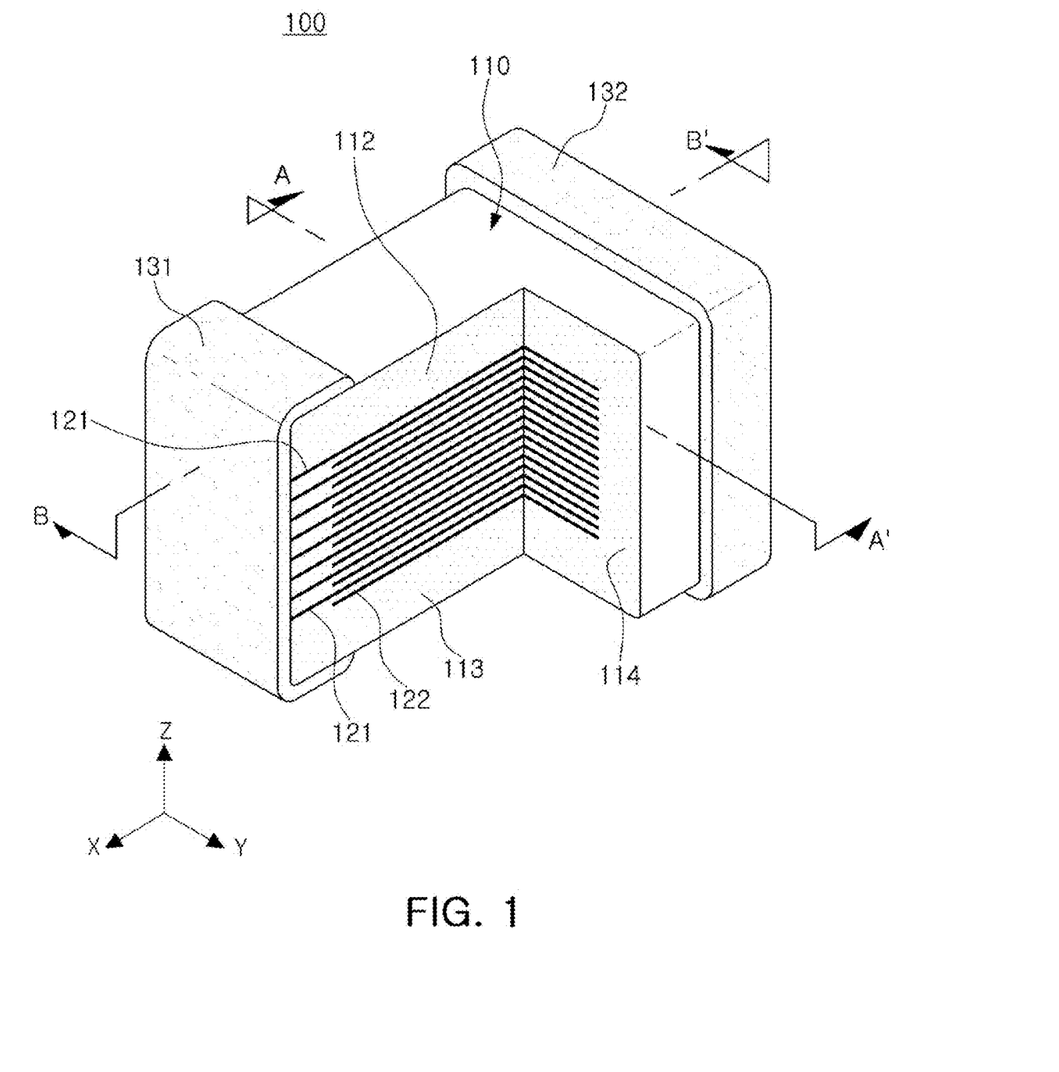
FIG. 1 is a perspective view illustrating a multilayer capacitor according to an embodiment of the present disclosure.
Figure 2:
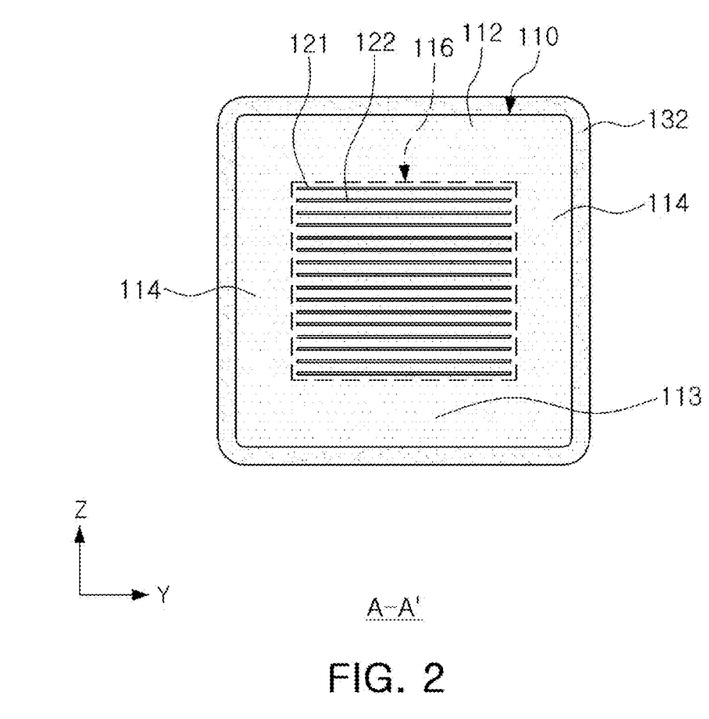
FIG. 2 is a cross-sectional view of the multilayer capacitor of FIG. 1, taken along line A-A'.
Figure 3A:
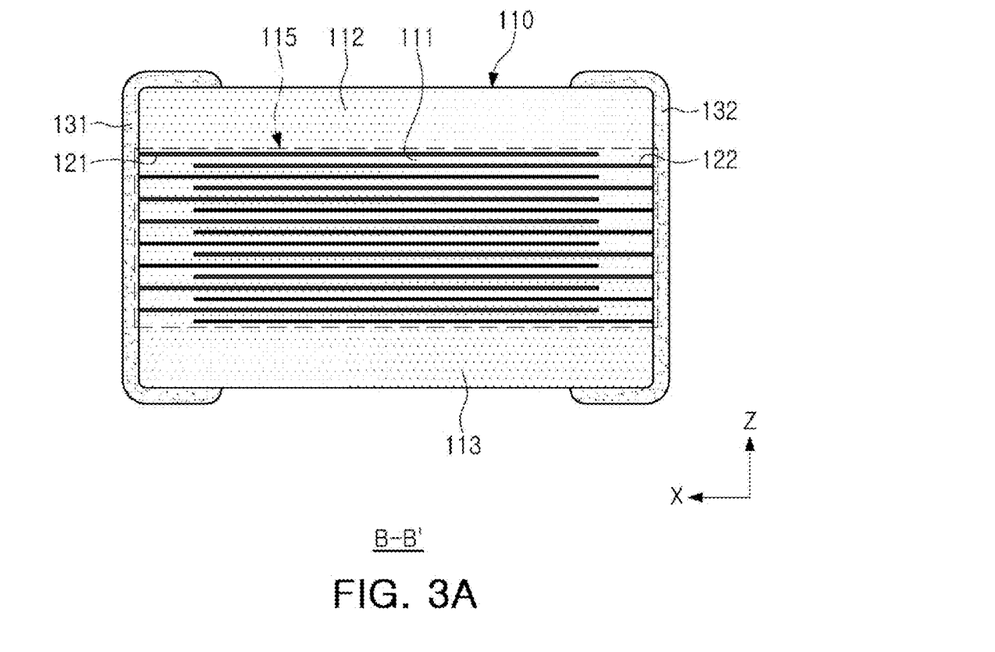
FIG. 3A is a cross-sectional view of the multilayer capacitor of FIG. 1, taken along line B-B'.

FIG. 1 is a perspective view illustrating a multilayer capacitor according to an embodiment of the present disclosure, FIG. 2 is a cross-sectional view of the multilayer capacitor of FIG. 1, taken along line A-A', and FIG. 3A is a cross-sectional view of the multilayer capacitor of FIG. 1, taken along line B-B'. Although FIG. 1 illustrates a shape cut at about ¼ of a total volume thereof to illustrate an interior of a body 110, an actual multilayer capacitor 100 may not be cut by about ¼ of a volume thereof, and may have an approximately symmetrical form with respect to the respective directions of the X-direction, the Y-direction, and the Z-direction from a center.

Referring to FIGS. 1, 2 and 3A, a multilayer capacitor 100 according to an embodiment of the present disclosure may include a body 110, a first external electrode 131, and a second external electrode 132.

The body 110 may have a stack structure in which at least one first internal electrode 121 and at least one second internal electrode 122 are alternately stacked in a first direction (e.g., the Z-direction) with at least one dielectric layer 111 interposed therebetween.

For example, the body 110 may be formed as a ceramic body by sintering the stack structure. In this case, at least one dielectric layer 111 disposed in the body 110 is in a sintered state, and boundaries between adjacent dielectric layers may be integrated to the extent that they may be difficult to determine without using a scanning electron microscope (SEM).

For example, the body 110 may be formed as a hexahedron having both side surfaces in the length direction X, both sides in the width direction Y, and both side surfaces in the thickness direction Z, and edges and corners of the hexahedron may be rounded as they are polished. A shape and a size of the body 110 and the number of stacked dielectric layers 111 are not limited to those illustrated in the present embodiment.

A thickness of the at least one dielectric layer 111 may be arbitrarily changed according to a capacitance design of the multilayer capacitor 100, and may include a ceramic powder having a high dielectric constant, for example, a barium titanate ($BaTiO_3$)-based powder. The present disclosure is not limited thereto. In addition, various ceramic additives (e.g., $MgO$, $Al_2O_3$, $SiO_2$, $ZnO$), organic solvents, plasticizers, binders, dispersants, or the like may be added to the ceramic powder according to the required specifications of the multilayer capacitor 100.

An average particle diameter of the ceramic powder used to form the at least one dielectric layer 111 is not particularly limited, and may be adjusted according to a required standard of the multilayer capacitor 100 (e.g., miniaturization and/or high capacitance in, for example, a capacitor for electronic devices, or high withstand voltage characteristics and/or strong strength in, for example, a capacitor for electrical devices), but may be adjusted to, for example, 400 nm or less.

For example, the at least one dielectric layer 111 may be formed by applying and drying a slurry formed including powder such as barium titanate ($BaTiO_3$) on a carrier film and thus providing a plurality of ceramic sheets. The ceramic sheet may be formed by preparing a slurry by mixing ceramic powder, a binder, and a solvent, and preparing the slurry in a sheet shape having a thickness of several μm by a doctor blade method, but the formation method is not limited thereto.

The at least one first internal electrode 121 and the at least one second internal electrode 122 may be formed by printing a conductive paste including a conductive metal, to be alternately exposed to one side and the other side of the body 110 in the length direction X, in the stacking direction (e.g., the Z-direction) of the dielectric layers. The at least one first internal electrode 121 and the at least one second internal electrode 122 may be electrically insulated from each other by a dielectric layer interposed therebetween.

For example, each of the at least one first internal electrode 121 and the at least one second internal electrode 122 may be formed of a conductive paste for an internal electrode, having an average particle size of 0.1 to 0.2 μm and having 40 to 50% by weight, but the material is not limited thereto. The conductive paste may be one of nickel (Ni), copper (Cu), palladium (Pd), silver (Ag), lead (Pb) or platinum (Pt) alone, or alloys thereof, but the present disclosure is not limited thereto.

For example, an internal electrode pattern may be formed by coating the internal electrode conductive paste on the ceramic sheet in a printing method or the like. As the method of printing the conductive paste, a screen-printing method, a gravure printing method, an inkjet printing method, or the like may be used, but the present disclosure is not limited thereto. For example, the body 110 may be manufactured by stacking 200 to 300 layers of the ceramic sheet on which the internal electrode pattern is printed, pressing, and sintering the same.

The capacitance of the multilayer capacitor 100 may be proportional to an overlapping area of the at least one first internal electrodes 121 and the at least one second internal electrodes 122 in the stacking direction (e.g., in the Z-direction), be proportional to the total number of stacking of the at least one first internal electrodes 121 and the at least one second internal electrodes 122, and be inversely proportional to a distance between the at least one first internal electrode 121 and the at least one second internal electrode 122. The distance may be substantially equal to the thickness of the at least one dielectric layer 111.

The multilayer capacitor 100 may have a relatively greater capacitance, compared to a thickness, as the distance between the at least one first internal electrode 121 and the at least one second internal electrode 122 decreases. A withstand voltage of the multilayer capacitor 100 may be increased as the distance increases. Therefore, the distance between the internal electrodes may be adjusted according to the required standard of the multilayer capacitor 100 (e.g., requirements for miniaturization and/or high capacitance such as in a capacitor for electronic devices, requirements for high withstand voltage characteristics and/or strong strength such as in a capacitor for an electric device, or the like). A thickness of each of the at least one first internal electrode 121 and the at least one second internal electrode 122 may also be affected by the distance between the internal electrodes.

For example, in the multilayer capacitor 100, when relatively high withstand voltage characteristics and/or strong strength are required, the distance between the at least one first internal electrode 121 and the at least one second internal electrode 122 may be designed to exceed twice each thickness. For example, when miniaturization and/or high capacitance are required, the multilayer capacitor 100 may be designed such that each of the first internal electrode 121 and the second internal electrode 122 has a thickness of 0.4 μm or less and the total number of stacks thereof is 400 or more.

The first and second external electrodes 131 and 132 may be disposed on the body 110 to be spaced apart from each other to be connected to the at least one first internal electrode 121 and the at least one second internal electrode 122, respectively.

For example, each of the first and second external electrodes 131 and 132 may be formed by a process of dipping in a paste containing a metal component, a process of printing a conductive paste, a sheet transfer process, a pad transfer process, a sputter plating process, an electrolytic plating process, or the like. For example, each of the first and second external electrodes 131 and 132 may include a base electrode layer formed as the paste is sintered, and a plating layer formed on an external surface of the base electrode layer, and may further include a conductive resin layer disposed between the base electrode layer and the plating layer. For example, the conductive resin layer may be formed as conductive particles are contained in a thermosetting resin such as epoxy. The metal component may be one of copper (Cu), nickel (Ni), palladium (Pd), platinum (Pt), gold (Au), silver (Ag), lead (Pb), tin (Sn), or the like alone, or alloys thereof, but the present disclosure is not limited thereto.

The multilayer capacitor 100 may be mounted on or embedded in an external board (e.g., a printed circuit board), connected to at least one of wires, lands, solders, or bumps of the external board through the first and second external electrodes 131 and 132, and thus electrically connected to a circuit (e.g., an integrated circuit, a processor) that is electrically connected to the external board.

Referring to FIGS. 1, 2 and 3A, the body 110 may include an upper cover layer 112, a lower cover layer 113, and a core region 115, and the core region 115 may include a margin region 114 and a capacitance formation region 116.

The upper and lower cover layers 112 and 113 may be disposed to have the core region 115 interposed therebetween in the first direction (e.g., the Z-direction) and may each have a thickness, greater than a thickness of each of the at least one dielectric layer 111.

The upper and lower cover layers 112 and 113 may prevent external environmental elements (e.g., moisture, plating solution, foreign substances) from penetrating into the core region 115, protect the body 110 from external impacts, and improve bending strength of the body 110.

For example, the upper and lower cover layers 112 and 113 may include a material the same as that of the at least one dielectric layer 111 or a different material (e.g., a thermosetting resin such as an epoxy resin).

Since the capacitance formation region 116 may include a region between the at least one first internal electrode 121 and the at least one second internal electrode 122, the capacitance of the multilayer capacitor 100 may be formed.

The capacitance formation region 116 may have a stack structure in which the at least one first internal electrode 121 and the at least one second internal electrode 122 are alternately stacked in the first direction (e.g., the Z-direction) with at least one dielectric layer 111 interposed therebetween, and may have the same size as the stack structure.

The margin region 114 may include a region between the boundary line between the at least one first internal electrode 121 and the at least one second internal electrode 122 and the surface of the body 110.

The plurality of margin regions 114 may be disposed to have the capacitance formation region 116 therebetween, in a second direction (e.g., the Y-direction), perpendicular to the first direction (e.g., the Z-direction). For example, the plurality of margin regions 114 may be formed in a manner similar to that of the at least one dielectric layer 111 (a stacking direction is different).

The plurality of margin regions 114 may prevent the at least one first internal electrode 121 and the at least one second internal electrode 122 from being exposed from the body 110 to a surface thereof in the second direction (e.g., the Y-direction). Therefore, external environmental elements (e.g., moisture, plating solution, foreign substances) may be prevented from penetrating into the at least one first internal electrode 121 and the at least one second internal electrode 122 through a surface of the body in the second direction, and reliability and lifespan of the multilayer capacitor 100 may be improved. In addition, since the at least one first internal electrode 121 and the at least one second internal electrode 122 may be formed to efficiently expand in the second direction due to the plurality of margin regions 114, the overlapping area of the first internal electrodes 121 and the second internal electrodes 122 may be increased by the plurality of margin regions 114, thereby contributing to improvement in the capacitance of the multilayer capacitor 100.

Figure 3B:
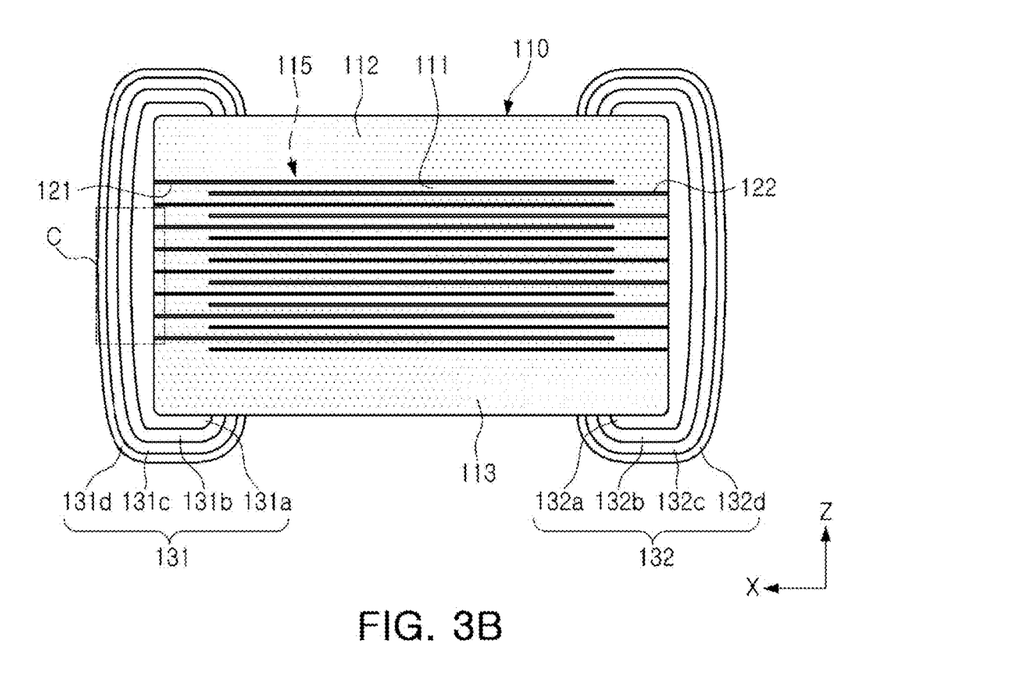
FIG. 3B is a cross-sectional view illustrating an external electrode of a multilayer capacitor according to an embodiment of the present disclosure.

FIG. 3B is a cross-sectional view illustrating an external electrode of a multilayer capacitor according to an embodiment of the present disclosure.

Referring to FIG. 3B, first and second external electrodes 131 and 132 may include at least one of a base electrode layer (131a and 132a), a conductive resin layer (131b and 132b), an internal plating layer (131c and 132c), and an external plating layer (131d and 132d), respectively.

The base electrode layer (131a and 132a) may be disposed between the conductive resin layer (131b and 132b) and a body 110, and may be connected to at least one first internal electrode 121 and at least one second internal electrode 122, respectively.

For example, the base electrode layer (131a and 132a) may be formed by sintering a state in which a portion of the body 110 is dipped into a paste containing a metal material and/or glass frit or a state in which the paste is printed on a portion of the body 110, or may be formed using a sheet transfer process or a pad transfer process. The metal material may be copper (Cu) to improve electrical connectivity to the body 110, but the present disclosure is not limited thereto. For example, the metal material may include at least one of copper (Cu), nickel (Ni), palladium (Pd), platinum (Pt), gold (Au), silver (Ag), and lead (Pb) and may be modified, depending on metal materials of the internal electrodes in the body 110.

The internal plating layer (131*c* and 132*c*) may be disposed between the external plating layer (131*d* and 132*d*) and the conductive resin layer (131*b* and 132*b*), and the external plating layer (131*d* and 132*d*) may be disposed to cover an external surface of the internal plating layer (131*c* and 132*c*).

For example, the internal plating layer (131*c* and 132*c*) and the external plating layer (131*d* and 132*d*) may be formed by a sputtering process or an electric deposition process, but the present disclosure is not limited thereto. The external plating layer (131*d* and 132*d*) may contain tin (Sn) having a melting point, lower than a temperature of a reflow process, to have efficiency when the first and second external electrodes 131 and 132 are electrically connected to and fixed to a substrate through a solder by a reflow process, and the internal plating layer (131*c* and 132*c*) may contain nickel (Ni) to increase respective connectivity to tin (Sn) and a metal material (e.g., copper) of the conductive resin layer (131*b* and 132*b*) or decrease interaction with each other, but the present disclosure is not limited thereto. For example, the internal plating layer (131*c* and 132*c*) may be omitted depending on the metal material (e.g., nickel) of the conductive resin layer (131*b* and 132*b*), or may contain an alternative material such as palladium (Pd) or platinum (Pt) depending on purposes of the multilayer capacitor (e.g., for high voltage). For example, each of the internal plating layer (131*c* and 132*c*) and the external plating layer (131*d* and 132*d*) may be implemented by copper (Cu), palladium (Pd), platinum (Pt), gold (Au), silver (Ag), lead (Pb), or the like alone, or an alloy thereof.

The conductive resin layer (131*b* and 132*b*) may be disposed between the internal plating layer (131*c* and 132*c*) and the base electrode layer (131*a* and 132*a*), and may be electrically connected to the at least one first internal electrode 121 and the at least one second internal electrode 122, respectively. When the base electrode layer (131*a* and 132*a*) is omitted, the conductive resin layer (131*b* and 132*b*) may be directly connected to the at least one first internal electrode 121 and the at least one second internal electrode 122, respectively.

Since the conductive resin layer (131*b* and 132*b*) may contain a resin to have relatively high ductility, as compared to the base electrode layer (131*a* and 132*a*), the internal plating layer (131*c* and 132*c*), and the external plating layer (131*d* and 132*d*), and absorb physical impact from external sources (including the body), or stress or tensile stress generated during processes of forming or mounting the first and second external electrodes 131 and 132 on a substrate, durability and reliability of the first and second external electrodes 131 and 132 may be improved. In addition, the conductive resin layer (131*b* and 132*b*) may effectively prevent moisture and/or plating solution from penetrating into the body 110 from the outside.

In addition, since the conductive resin layer (131*b* and 132*b*) may be implemented to have conductivity, an increase in equivalent series resistance (ESR) may be prevented. For example, the conductive resin layer (131*b* and 132*b*) may be formed by dipping or printing a resin paste, and the resin paste may further include a metal material to provide a seed for a plating layer and/or conductivity of the conductive resin layer (131*b* and 132*b*). The metal material may be the same as the metal material of the base electrode layer (131*a* and 132*a*), but the present disclosure is not limited thereto.

Figure 4:
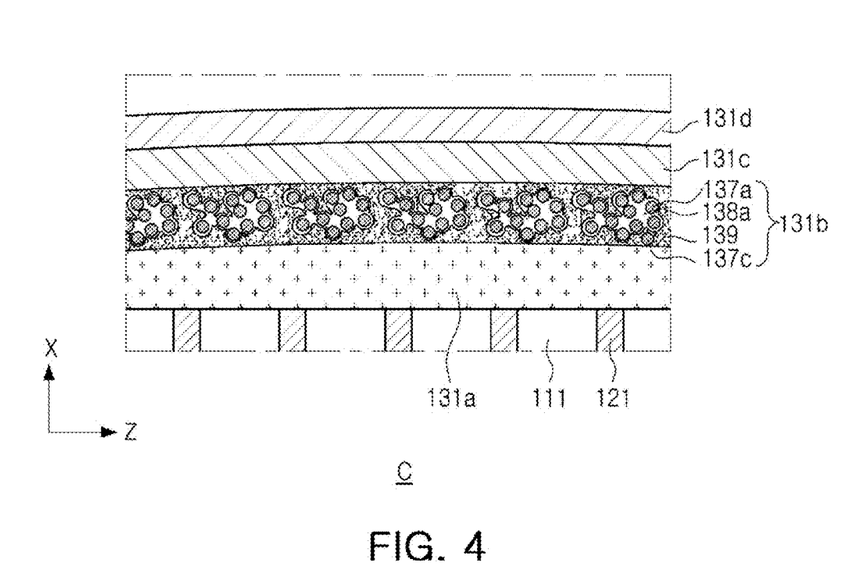
FIG. 4 is an enlarged cross-sectional view of portion C of FIG. 3B.

FIG. 4 is an enlarged cross-sectional view of portion C of FIG. 3B. FIG. 4 illustrates only the first external electrode among the first and second external electrodes to illustrate efficiency, a structure illustrated in FIG. 4 may be equally applied to the second external electrode.

Referring to FIG. 4, the conductive resin layer 131*b* may include a resin 139, a plurality of metal particles 137*a* and 137*c*, and a conductive connection portion 138*a* connecting portions 137*a* of the plurality of metal particles to each other.

The conductive connection portion 138*a* may connect the portions 137*a* of the plurality of metal particles to each other, to increase overall electrical connectivity of the plurality of metal particles 137*a* and 137*c* and increase an electrical connection area. Therefore, since the conductive connection portion 138*a* may increase an electrical connection width of the conductive resin layer 131*b*, equivalent series resistance (ESR) of the conductive connection portion 138*a* may be further lowered. For example, the conductive connection portion 138*a* may connect the portions 137*a* of the plurality of metal particles to each other to form an intermetallic compound (IMC) cluster.

For example, the conductive connection portion 138*a* may include a metal material (e.g., tin) that may have fluidity, higher than fluidity of the plurality of metal particles 137*a* and 137*c* in a specific temperature range (e.g., a reflow process temperature), to efficiently connect the portions 137*a* of the plurality of metal particles to each other. The metal material of the conductive connection portion 138*a* is not limited to tin, and may be at least one of a low-melting-point material such as tin (Sn), lead (Pb), indium (In), and bismuth (Bi).

Since the plurality of metal particles 137*a* and 137*c* may include a metal material (e.g., copper or silver) having conductivity, relatively higher than conductivity of the conductive connection portion 138*a*, the plurality of metal particles 137*a* and 137*c* may be used in a core that may have conductivity of the conductive resin layer 131*b*. In addition, since a metal material having high electrical conductivity may have a relatively high melting point, the metal material may be effective to form an IMC cluster according to a difference in fluidity with the conductive connection portion 138*a*. For example, the plurality of metal particles 137*a* and 137*c* may contain a metal material having a melting point, higher than a melting point of the conductive connection portion 138*a* and/or a melting point of the external plating layer 131*d*.

For example, the resin 139 may be a thermosetting resin, and the thermosetting resin may be an epoxy resin. Therefore, adhesion between the conductive resin layer 131*b* and the base electrode layer 131*a* may be improved, and penetration of a plating solution or moisture into the body 110 in a process of forming the internal plating layer 131*c* and/or the external plating layer 131*d* may be effectively prevented. The resin 139 is not limited to the epoxy resin, and may be a bisphenol A resin, a glycol epoxy resin, a novolak epoxy resin, or a liquid resin at room temperature due to a small molecular weight among derivatives thereof.

The resin 139 may be affected by a process in which the conductive connection portion 138*a* connects the portions 137*a* of the plurality of metal particles to each other. Also, the resin 139 may be affected by a process of forming the internal plating layer 131*c* and/or the external plating layer 131*d*, and a high-temperature process such as a reflow process for mounting of an external electrode or the like, together. In the high-temperature process, a bond between carbon (C) and oxygen (O) of the resin 139 may be oxidized as carbon dioxide ($CO_2$) gas. Since the gas is emitted from an inside of the conductive resin layer 131b to an outside, arrangement stability of the conductive resin layer 131b with respect to adjacent structures (e.g., the body, the base electrode layer, and the plating layer) may be affected.

Therefore, the gas may be reduced when the oxidation of the bond between carbon (C) and oxygen (O) of the resin 139 is reduced. In the conductive resin layer 131b, as a volume ratio of the metal particles 137c spaced apart from the conductive connection portion 138a, among the plurality of metal particles, with respect to the sum of the plurality of metal particles 137a+137c and the conductive connection portion 138a is lower, the conductive connection portion 138a may be formed more evenly in the conductive resin layer 131b, and overall interaction between the resin 139 and the metal particles 137c spaced apart therefrom may be reduced. Therefore, a phenomenon of locally concentrating oxidation energy on the resin 139 may be suppressed, and gas resulting from the oxidation of the bond between carbon (C) and oxygen (O) of the resin 139 may be reduced. Therefore, arrangement stability of the conductive resin layer 131b with respect to adjacent structures (e.g., the body, the base electrode layer, the plating layer) may be improved, and possibility of delamination between the conductive resin layer 131b and the adjacent structures may be reduced.

In addition, in the conductive resin layer 131b, as a volume ratio of the metal particles 137c spaced apart from the conductive connection portion 138a, among the plurality of metal particles, with respect to the sum of the plurality of metal particles 137a+137c and the conductive connection portion 138a is lower, the conductive connection portion 138a may be formed more evenly in the conductive resin layer 131b. Therefore, an electrical connection width of the conductive resin layer 131b may be wider, and an equivalent series resistance (ESR) value of the conductive connection portion 138a may be lowered.

Figure 5:
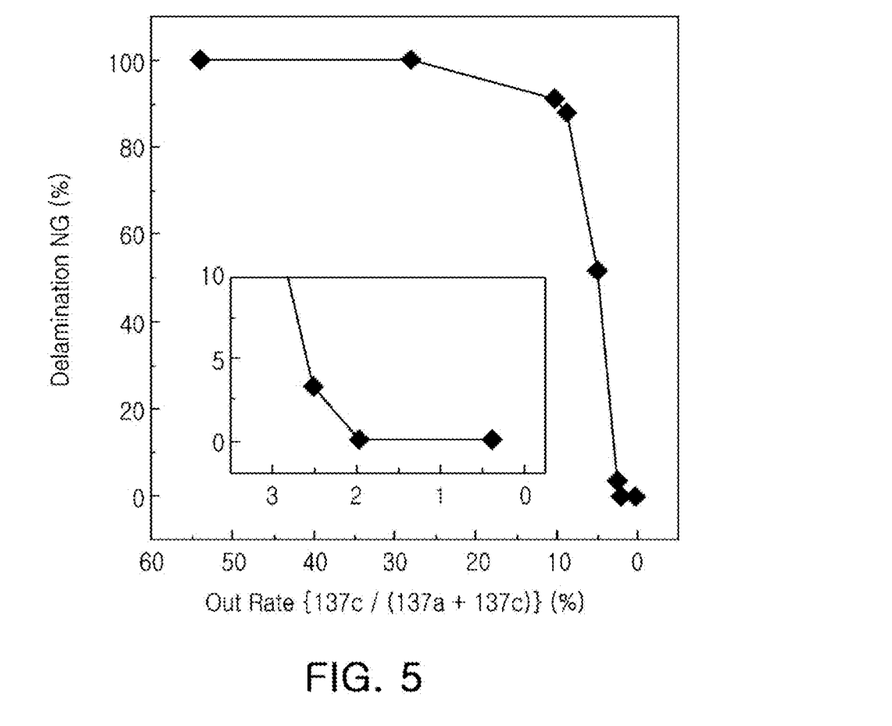
FIG. 5 is a graph illustrating possibility of delamination NG in an external electrode according to a volume ratio (Out Rate) of metal particles spaced apart from a conductive connection portion among a plurality of metal particles, compared to a sum of the plurality of metal particles and the conductive connection portion.

FIG. 5 is a graph illustrating possibility of delamination NG in an external electrode according to a volume ratio (Out Rate) of metal particles spaced apart from a conductive connection portion among a plurality of metal particles, compared to a sum of the plurality of metal particles and the conductive connection portion.

Referring to FIG. 5, in the conductive resin layer 131b, when volume ratios (out rates) of the metal particles 137c spaced apart from the conductive connection portion 138a, among the plurality of metal particles, with respect to the sum of the plurality of metal particles 137a+137c and the conductive connection portion 138a is 10.2%, 4.9%, 2.5%, 2%, and 0.4%, probability of delamination NG may be {(42/60)*100}%, {(31/60*100}%, {(2/60)*100}%, {(0/60) *100}%, and {(0/60)*100}%), respectively. In this case, the denominator of the possibility may be the number of samples to be measured, and the numerator may be the number of samples in which peeling failures have occurred. The number of samples is not limited to 60, and may be a smaller number (e.g., 20).

When the volume ratio (out rate) is less than 4.9%, possibility of delamination NG may be greatly reduced. Therefore, in a conductive resin layer of a multilayer capacitor according to an embodiment of the present disclosure, a volume ratio (out rate) of metal particles spaced apart from a conductive connection portion among a plurality of metal particles may be greater than 0% and less than 4.9%, and possibility of peeling failure may be greatly reduced.

When the volume ratio (out rate) is less than 2.5%, probability of delamination NG may be virtually 0%. Therefore, in a conductive resin layer of a multilayer capacitor according to an embodiment of the present disclosure, a volume ratio (out rate) of metal particles spaced apart from a conductive connection portion among a plurality of metal particles may be less than 2.5%, and peeling failure may be prevented.

In addition, in a conductive resin layer of a multilayer capacitor according to an embodiment of the present disclosure, a volume ratio (out rate) may be 2% or less, and peeling failure may be more stably prevented.

In a sample measured to obtain the values of FIG. 5, in a conductive resin layer, a mass ratio of a resin to entire metal materials contained in the conductive resin layer may be 5% or more and 20% or less. In addition, in the sample, in the conductive resin layer, a mass ratio of a conductive connection portion (e.g., tin) with respect to a sum of a metal material (e.g., silver), coated on at least a portion of a plurality of metal particles, and the plurality of metal particles (e.g., copper) may be 4/6 or more and 7/3 or less. For example, the mass ratio may be determined by analyzing a cross-section of a multilayer capacitor in the X-Z direction using energy-dispersive X-ray spectroscopy (EDS) with a transmission electron microscopy (TEM), an atomic force microscope (AFM), or a scanning electron microscope (SEM).

Figure 6A:
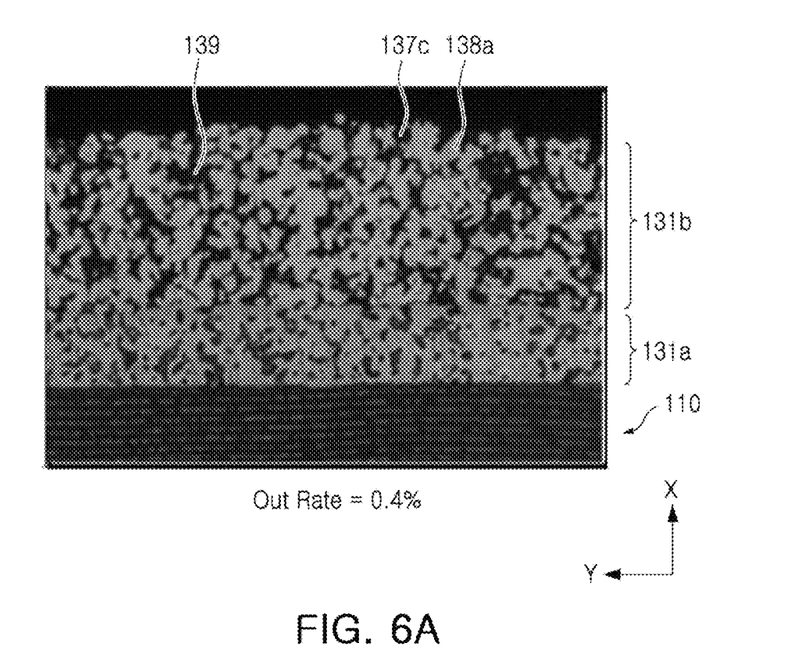
FIGS. 6A to 6C are photos illustrating a cross-section of an external electrode according to an out rate of metal particles spaced apart from a conductive connection portion.
Figure 6B:
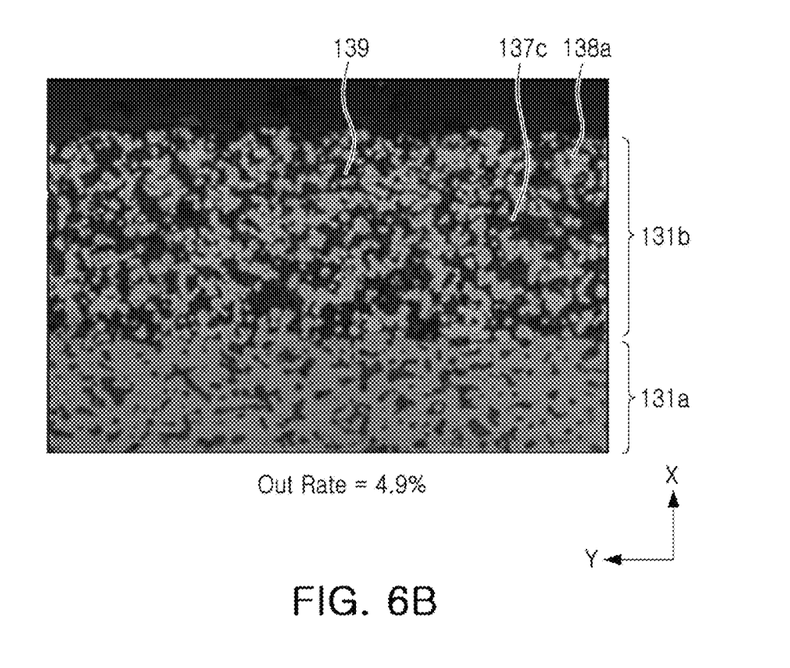
Figure 6C:
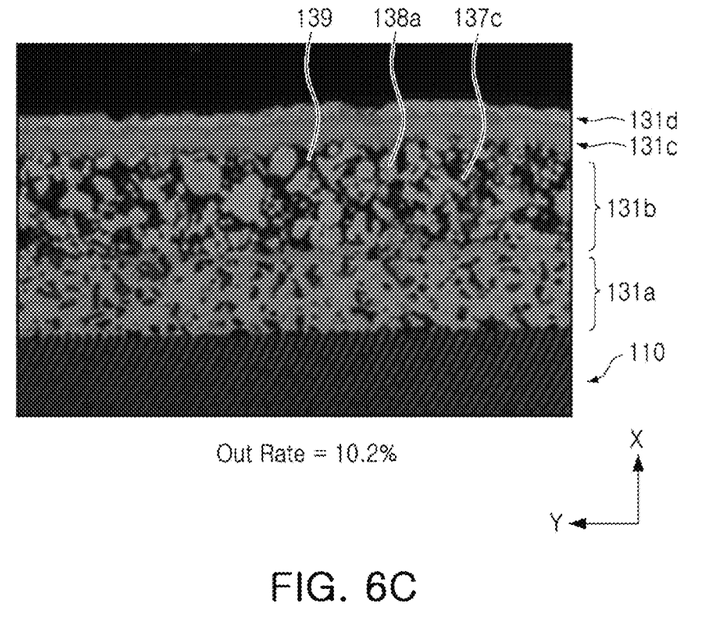
Figure 7A:
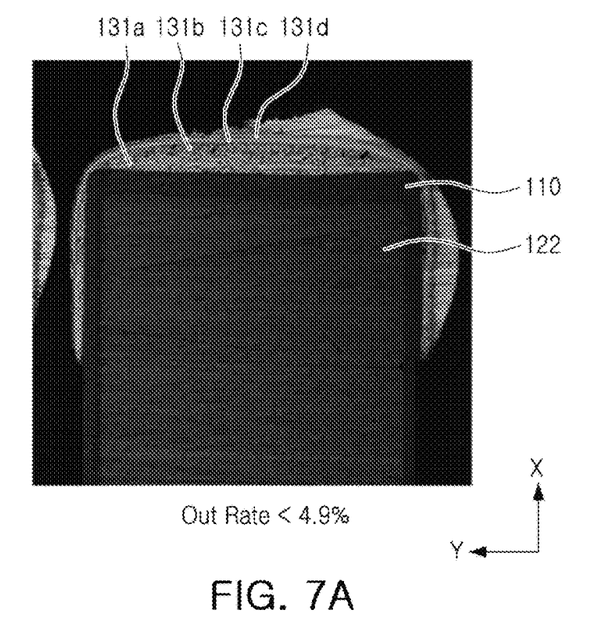
FIGS. 7A and 7B are photos illustrating a cross-section of a multilayer capacitor according to an out rate of metal particles spaced apart from a conductive connection portion.
Figure 7B:
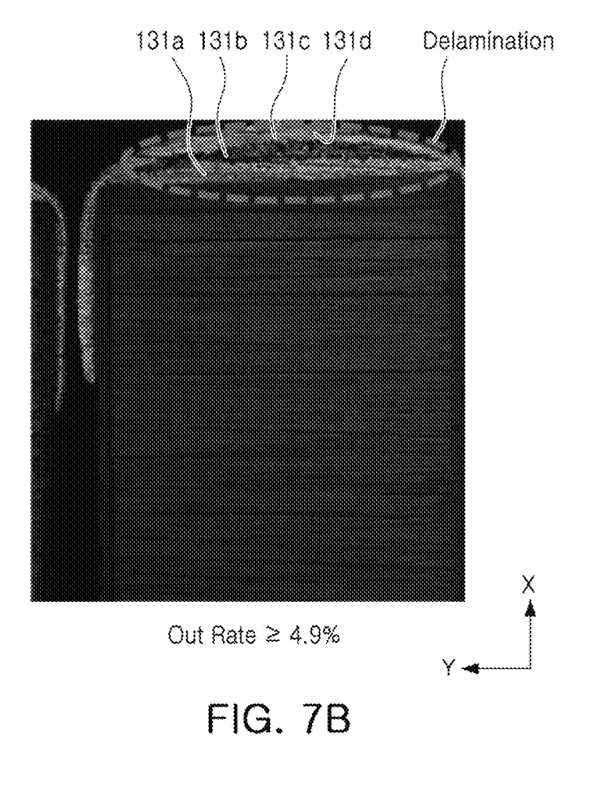

FIGS. 6A to 6C are photos illustrating a cross-section of an external electrode according to an out rate of metal particles spaced apart from a conductive connection portion, and FIGS. 7A and 7B are photos illustrating a cross-section of a multilayer capacitor according to an out rate of metal particles spaced apart from a conductive connection portion.

Referring to FIGS. 6A and 7A, a volume ratio (out rate) of metal particles 137c spaced apart from a conductive connection portion 138a with respect to overall metal particles of a conductive resin layer 131b in a multilayer capacitor according to an embodiment of the present disclosure may be less than 4.9% (e.g., 0.4%), and may be lower than when a volume ratio (out rate) of metal particles 137c spaced apart from a conductive connection portion 138a with respect to overall metal particles of a conductive resin layer 131b is 4.9% or more (e.g., 4.9%, 10.2%), as illustrated in FIGS. 6B, 6C, and 7B.

For example, the photos of FIGS. 6A to 7B may be obtained by applying a cross-section of a multilayer capacitor to analysis using at least one of a micrometer, a transmission electron microscopy (TEM), an atomic force microscope (AFM), a scanning electron microscope (SEM), an optical microscope, or a surface profiler. The cross-section may be obtained by grinding or cutting the multilayer capacitor in the T or W direction to expose an L-W plane or an L-T plane including a center of the multilayer capacitor. For example, magnification of the optical microscope may be 200 times for the stack capacitor having a 1608 size, and 100 times for the stack capacitor having a 3225 size.

Since a conductive resin layer 131b of FIG. 7B includes delamination, the conductive resin layer 131b of FIG. 7B may have brightness, lower than brightness of a conductive resin layer 131b of FIG. 7A. For example, identification of spaced metal particles 137c and identification of low brightness of the delamination in the photos of FIGS. 6A to 7B may be performed through an image processing program (e.g., an ImageJ program), and a volume ratio (out rate) of the spaced metal particles 137c may be calculated based on the number of pixels in the image in which RGB coordinate values fall within a specific range (e.g., an R range of 150 to 165, a G range of 75 to 85, and a B range of 45 to 55), and whether the delamination occurs may be determined according to whether the total number of pixels having a brightness value within a specific range in an image within the external electrode is greater than or equal to a specific number.

Figure 8A:
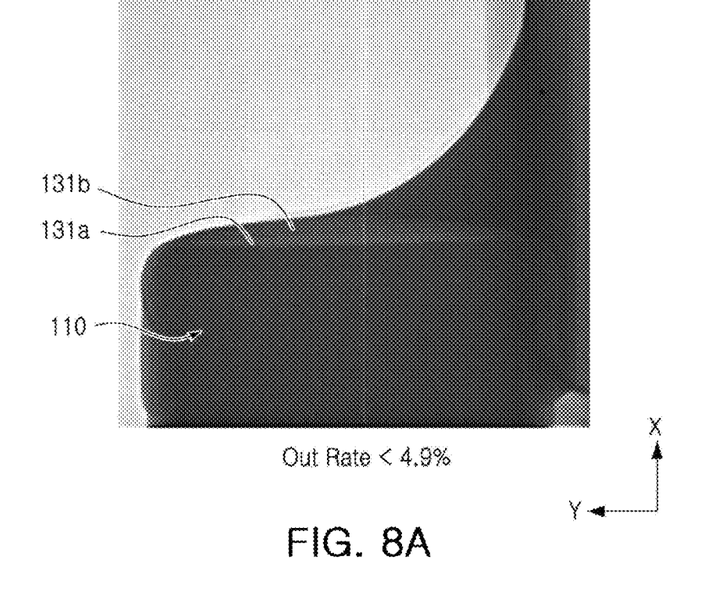
FIGS. 8A and 8B are X-ray photos illustrating a side surface of a multilayer capacitor according to an out rate of metal particles spaced apart from a conductive connection portion.
Figure 8B:
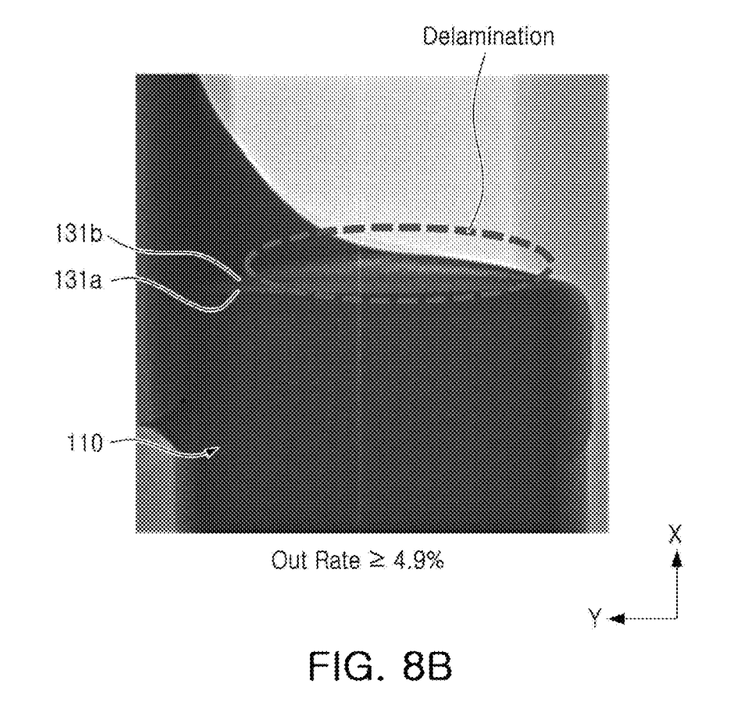

FIGS. 8A and 8B are X-ray photos illustrating a side surface of a multilayer capacitor according to an out rate of metal particles spaced apart from a conductive connection portion.

Referring to FIG. 8A, a volume ratio (out rate) of metal particles spaced apart from a conductive connection portion with respect to overall metal particles of a conductive resin layer 131b of a multilayer capacitor according to an embodiment of the present disclosure may be less than 4.9% (e.g., 0.4%), and unlike the X-ray transmission in an empty space of delamination illustrated in FIG. 8B, there may be no area or may be very small area through which X-rays are transmitted. Since the photos of FIGS. 8A and 8B are X-ray photos, they may be obtained from a multilayer capacitor without grinding or cutting the multilayer capacitor.

Figure 9A:
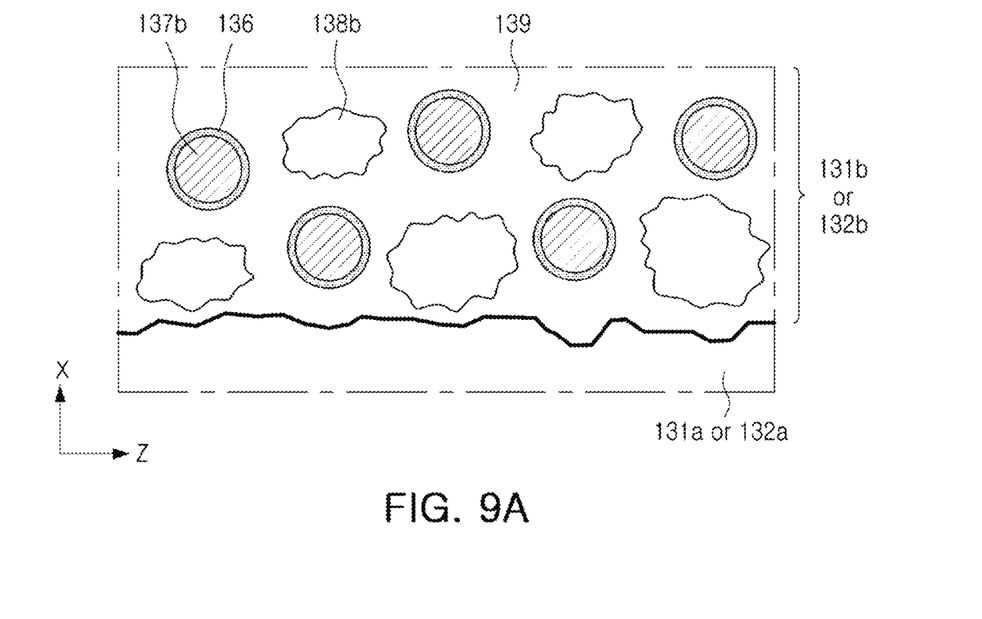
FIGS. 9A and 9B are cross-sectional views illustrating external electrodes before and after a conductive connection portion is formed in a multilayer capacitor according to an embodiment of the present disclosure.
Figure 9B:
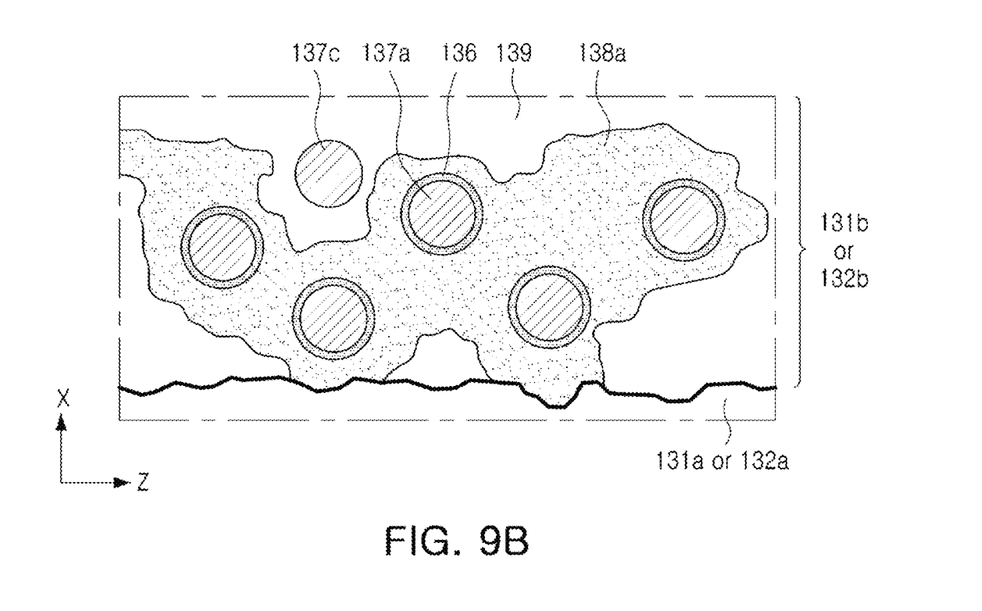

FIGS. 9A and 9B are cross-sectional views illustrating external electrodes before and after a conductive connection portion is formed in a multilayer capacitor according to an embodiment of the present disclosure.

Referring to FIG. 9A, a conductive connection portion 138b in an initial state may not be connected to a plurality of metal particles 137b, and at least a portion of the plurality of metal particles 137b may be coated with a metal material 136 having a standard electrode potential, higher than a standard electrode potential of the plurality of metal particles 137b (e.g., that of copper). For example, the metal material 136 to be coated may be silver (Ag), and may form a core-shell structure, together with the plurality of metal particles 137b.

Referring to FIG. 9B, a conductive connection portion 138a may connect a plurality of metal particles 137a through a metal material 136 to be coated thereon, having fluidity at a temperature higher than a melting point of the conductive connection portion 138a. In this case, since the metal material 136 coated on the plurality of metal particles 137a may increase bonding property to the conductive connection portion 138a, and may decrease a volume ratio of metal particles 137c spaced apart from the conductive connection portion 138a.

Although FIG. 9B shows a structure in which the spaced apart metal particles 137c are not coated, at least a portion of the spaced apart metal particles 137c may also be coated with the metal material 136. For example, a ratio of the metal particles coated by the metal material 136, among the plurality of metal particles 137b of FIG. 9A, is not particularly limited, a coating ratio or an overall coating thickness of the metal material 136 may be adjusted by controlling a ratio of the metal material 136 with respect to the plurality of metal particles 137b or a paste mixing process, and a volume ratio of the metal particles 137c spaced apart from the conductive connection portion 138a may be adjusted to be less than 4.9%.

Shapes of the plurality of metal particles 137a and 137c are not limited to spherical shapes, and may be elliptical shapes, needle shapes, or flake shapes. A particle diameter of each of the plurality of metal particles 137a and 137c is not particularly limited, but may be 0.2 μm to 20 μm.

Figure 10A:
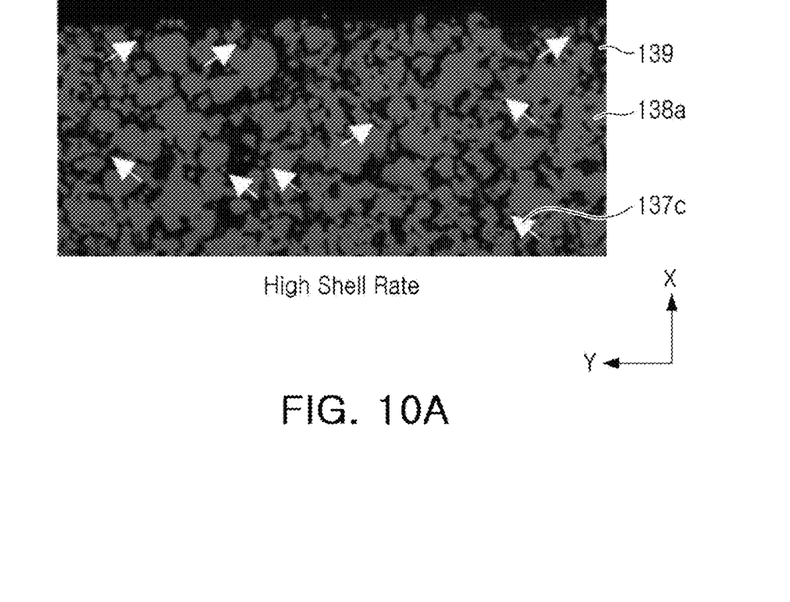
FIGS. 10A and 10B are photos illustrating a cross-section of an external electrode according to a ratio of metal particles including a shell by coating among a plurality of metal particles.
Figure 10B:
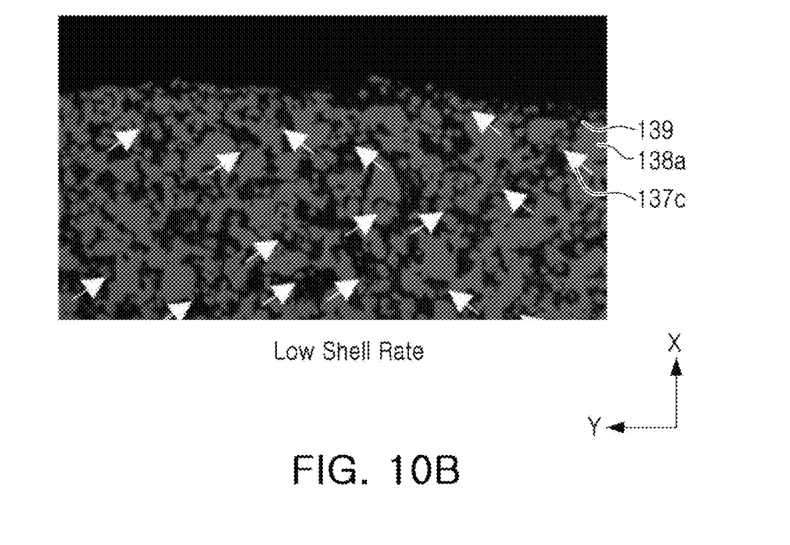

FIGS. 10A and 10B are photos illustrating a cross-section of an external electrode according to a ratio of metal particles including a shell by coating among a plurality of metal particles.

Referring to FIG. 10A, in a multilayer capacitor according to an embodiment of the present disclosure, a ratio of metal particles having a core-shell structure may be relatively high (e.g., 100%), and a ratio of spaced metal particles 137c may be relatively low, compared to a case in which a ratio of metal particles having a core-shell structure illustrated in FIG. 10B is relatively low (e.g., 0%).

Figure 11:
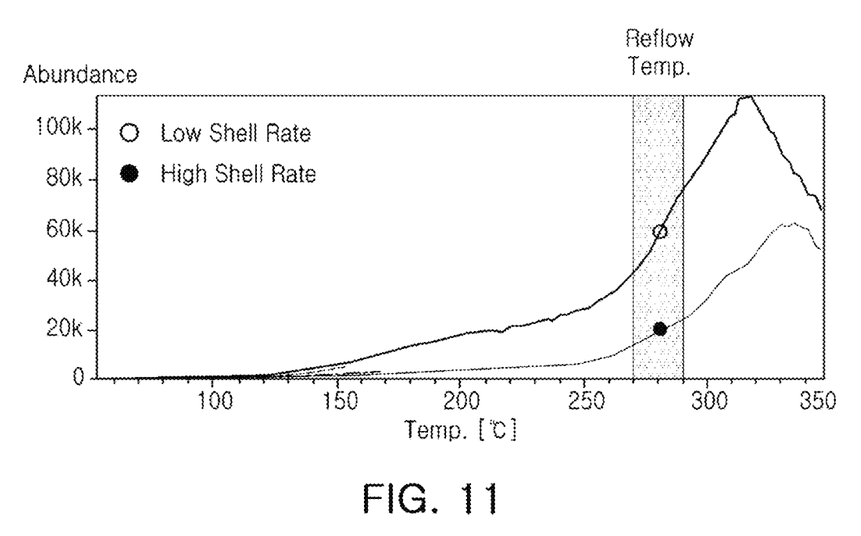
FIG. 11 is a graph illustrating an amount of gas generated from the external electrode, such as carbon dioxide ($CO_2$) or the like, according to a temperature.

FIG. 11 is a graph illustrating an amount of gas generated from the external electrode, such as carbon dioxide ($CO_2$) or the like, according to a temperature.

Referring to FIG. 11, a reflow process temperature may be about 260 degrees, and when a ratio of metal particles having a core-shell structure may be high (a high shell rate), an amount of gas generated (abundance) may be relatively low, compared to an amount of gas generated (abundance) in a case in which a ratio of metal particles of the core-shell structure is low (a low shell rate). When an amount of gas generated (abundance) is low, peeling possibility of an external electrode may be reduced.

A multilayer capacitor according to an embodiment of the present disclosure may effectively improve performance of an external electrode (e.g., at least one of reliability, durability, stacking stability, or reduction in equivalent series resistance).

While example embodiments have been illustrated and described above, it will be apparent to those skilled in the art that modifications and variations could be made without departing from the scope of the present disclosure as defined by the appended claims.

What is claimed is:

1. A multilayer capacitor comprising:
a body including a stack structure in which at least one first internal electrode and at least one second internal electrode are alternately stacked in a first direction with at least one dielectric layer interposed therebetween; and
first and second external electrodes spaced apart from each other and disposed on the body to be respectively connected to the at least one first internal electrode and the at least one second internal electrode,
wherein each of the first and second external electrodes comprises a conductive resin layer including a resin, a plurality of metal particles, and a conductive connection portion connecting portions of the plurality of metal particles to each other, and
in the conductive resin layer, a volume ratio of metal particles spaced apart from the conductive connection portion, among the plurality of metal particles, to a sum of the plurality of metal particles and the conductive connection portion is greater than 0% and less than 4.9%.

2. The multilayer capacitor of claim 1, wherein each of the first and second external electrodes further comprises a base electrode layer disposed between the conductive resin layer and the body and containing a metal material having a melting point higher than a melting point of the conductive connection portion.

3. The multilayer capacitor of claim 2, wherein each of the metal material of the base electrode layer and the plurality of metal particles comprises copper (Cu).

4. The multilayer capacitor of claim 2, wherein each of the first and second external electrodes further comprises an external plating layer containing a metal material having a melting point lower than a melting point of the plurality of metal particles.

5. The multilayer capacitor of claim 4, wherein each of the first and second external electrodes further comprises an internal plating layer disposed between the external plating layer and the conductive resin layer and containing nickel (Ni), wherein the external plating layer contains tin (Sn).

6. The multilayer capacitor of claim 1, wherein the resin of the conductive resin layer comprises an epoxy resin.

7. The multilayer capacitor of claim 6, wherein, in the conductive resin layer, a mass ratio of the resin to entire metal materials contained in the conductive resin layer is 5% or more and 20% or less.

8. The multilayer capacitor of claim 1, wherein at least a portion of the plurality of metal particles are coated with a metal material having a standard electrode potential, higher than a standard electrode potential of the plurality of metal particles.

9. The multilayer capacitor of claim 8, wherein the plurality of metal particles comprise copper (Cu),
the at least a portion of the plurality of metal particles are coated with silver (Ag).

10. The multilayer capacitor of claim 9, wherein, in the conductive resin layer, a mass ratio of the conductive connection portion to a sum of the metal material coated on the at least a portion of the plurality of metal particles and the plurality of metal particles is 4/6 or more and 7/3 or less.

11. The multilayer capacitor of claim 1, wherein, in the conductive resin layer, the volume ratio of the metal particles spaced apart from the conductive connection portion, among the plurality of metal particles, to the sum of the plurality of metal particles and the conductive connection portion is greater than 0% and less than 2.5%.

12. The multilayer capacitor of claim 11, wherein, in the conductive resin layer, the volume ratio of the metal particles spaced apart from the conductive connection portion among the plurality of metal particles to the sum of the plurality of metal particles and the conductive connection portion is greater than 0% and 2% or less.

13. A multilayer capacitor comprising:
a body including a stack structure in which at least one first internal electrode and at least one second internal electrode are alternately stacked with at least one dielectric layer interposed therebetween; and
first and second external electrodes spaced apart from each other and disposed on the body to be respectively connected to the at least one first internal electrode and the at least one second internal electrode,
wherein each of the first and second external electrodes comprises a conductive resin layer including a resin, a plurality of metal particles, and a conductive connection portion connecting portions of the plurality of metal particles to each other,
the plurality of metal particles comprise a first metal,
at least a portion of the plurality of metal particles is coated with a second metal, and
a mass ratio of the conductive connection portion to a sum of the second metal coated on the at least a portion of the plurality of metal particles and the plurality of metal particles is 4/6 or more and 7/3 or less.

14. The multilayer capacitor of claim 13, wherein the first and second metals are different.

15. The multilayer capacitor of claim 13, wherein the conductive connection portion includes a third metal that is different from the second metal.

16. The multilayer capacitor of claim 13, wherein the conductive connection portion includes a third metal that is different from the first metal.

17. The multilayer capacitor of claim 16, wherein the third metal includes tin.

18. The multilayer capacitor of claim 17, wherein the first metal includes copper.

19. The multilayer capacitor of claim 18, wherein the second metal includes silver.

20. The multilayer capacitor of claim 13, wherein a volume ratio of metal particles spaced apart from the conductive connection portion to a sum of the plurality of metal particles and the conductive connection portion is greater than 0% and less than 4.9%.

* * * * *